Nov. 24, 1931.          H. H. CUTLER              1,833,048
                      SPEED CONTROL SYSTEM
                   Filed Nov. 11, 1930    2 Sheets-Sheet 1

Henry H. Cutler
INVENTOR:

By Geo. K. Woodworth
ATTORNEY:

Nov. 24, 1931.    H. H. CUTLER    1,833,048
SPEED CONTROL SYSTEM
Filed Nov. 11, 1930    2 Sheets-Sheet 2
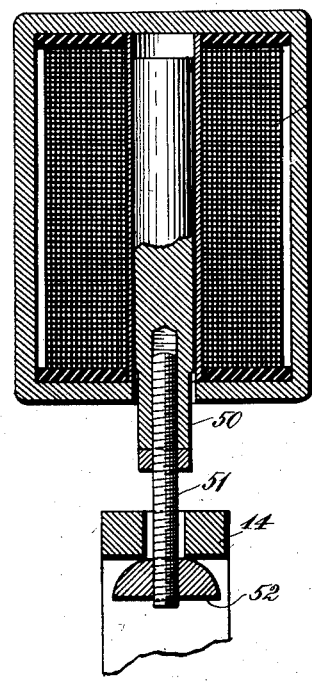
Fig.4.
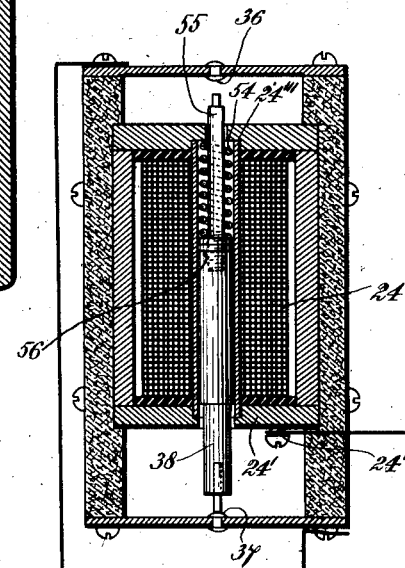
Fig.2.
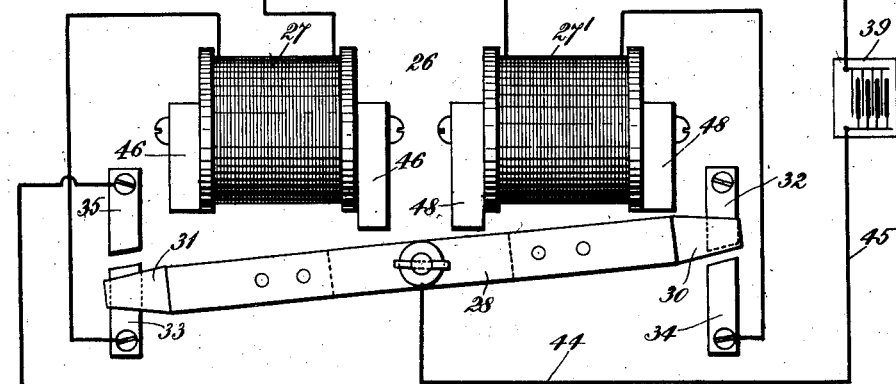
Fig.3.
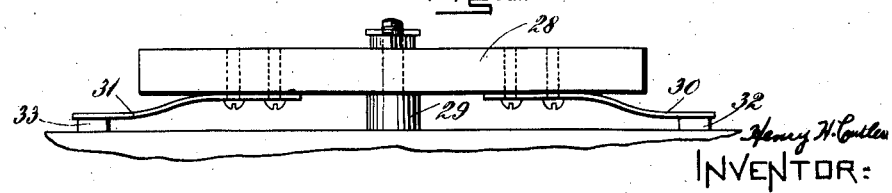
INVENTOR:
Henry H. Cutler
By Geo. K. Woodworth
ATTORNEY:

Patented Nov. 24, 1931

1,833,048

UNITED STATES PATENT OFFICE

HENRY H. CUTLER, OF CORAL GABLES, FLORIDA

SPEED CONTROL SYSTEM

Application filed November 11, 1930. Serial No. 494,908.

My invention relates to distant electric control of the speed of internal combustion engines, steam engines and the like, and has special application to the control from the wheel-house of the speed of two or more Diesel engines in a twin-screw or three-screw vessel, and also to the steering of such vessel without the use of the rudder or signalling the engine room, such control and steering being effected through my improved system solely by the navigator stationed in the wheel-house or at any other convenient point located at a distance from the engines.

In a twin-screw Diesel engine-driven vessel, it is highly desirable automatically to maintain the speed of both engines the same through a wide range of variation, which range according to my system is under the control of the navigator, and also to enable the latter to change at will the relative speed of the two engines in order to steer the vessel independently of the rudder.

To accomplish the foregoing object, it is necessary to employ a governor which is more sensitive, and more capable of controlling engine speeds with a close degree of regulation, than any form of mechanical governor known today. It is essential also that means be employed to eliminate the effect of vessel vibration on electrical contacts which otherwise would tremble under such vibration and cause "hunting" of the governor.

My invention, accordingly, comprises an electrical generator driven by the prime mover, the speed of which is to be controlled, and electrical means for controlling the throttle-actuating mechanism in accordance with the voltage developed by the generator. In the preferred form of my invention, the means for controlling the throttle-actuating mechanism comprises a generator field regulator, a solenoid energized by said generator, such solenoid necessarily being subject to the vessel vibration and closing its circuit with a trembling contact, and a self-locking relay unaffected by the trembling of the contacts of said solenoid, said relay being controlled by said solenoid and in turn controlling the throttle-actuating magnet. The self-locking relay preferably is a double relay having an armature pivoted intermediate the ends thereof and constructed and arranged to open its own circuit as soon as it is energized, and to remain in one of two fixed positions. The two electromagnets of said relay have a common armature and the connections are such that the circuit of one of said electromagnets is closed when the generator voltage rises, and the circuit of the other is closed when said voltage falls. Preferably a plurality of solenoids or governor magnets energized by the generator are employed and each in turn controls a double self-locking relay which in turn closes the circuit of a throttle-actuating magnet when the armature of said relay is in one of two fixed positions, and opens the same when the armature is in the other of said fixed positions.

The drawings which accompany and form a part of this specification illustrate diagrammatically a speed control system embodying my invention, in which drawings Figure 1 is a diagram of said speed-control system applied to a four-cylinder Diesel engine;

Fig. 2 is an elevation partly in section of one of the double relays with its governor magnet which are shown conventionally in Fig. 1;

Fig. 3 is a plan view of the combined armature and switch of said double relay;

Fig. 4 is a central, longitudinal section of one of the throttle-controlling magnets shown conventionally in Fig. 1.

Figure 1:
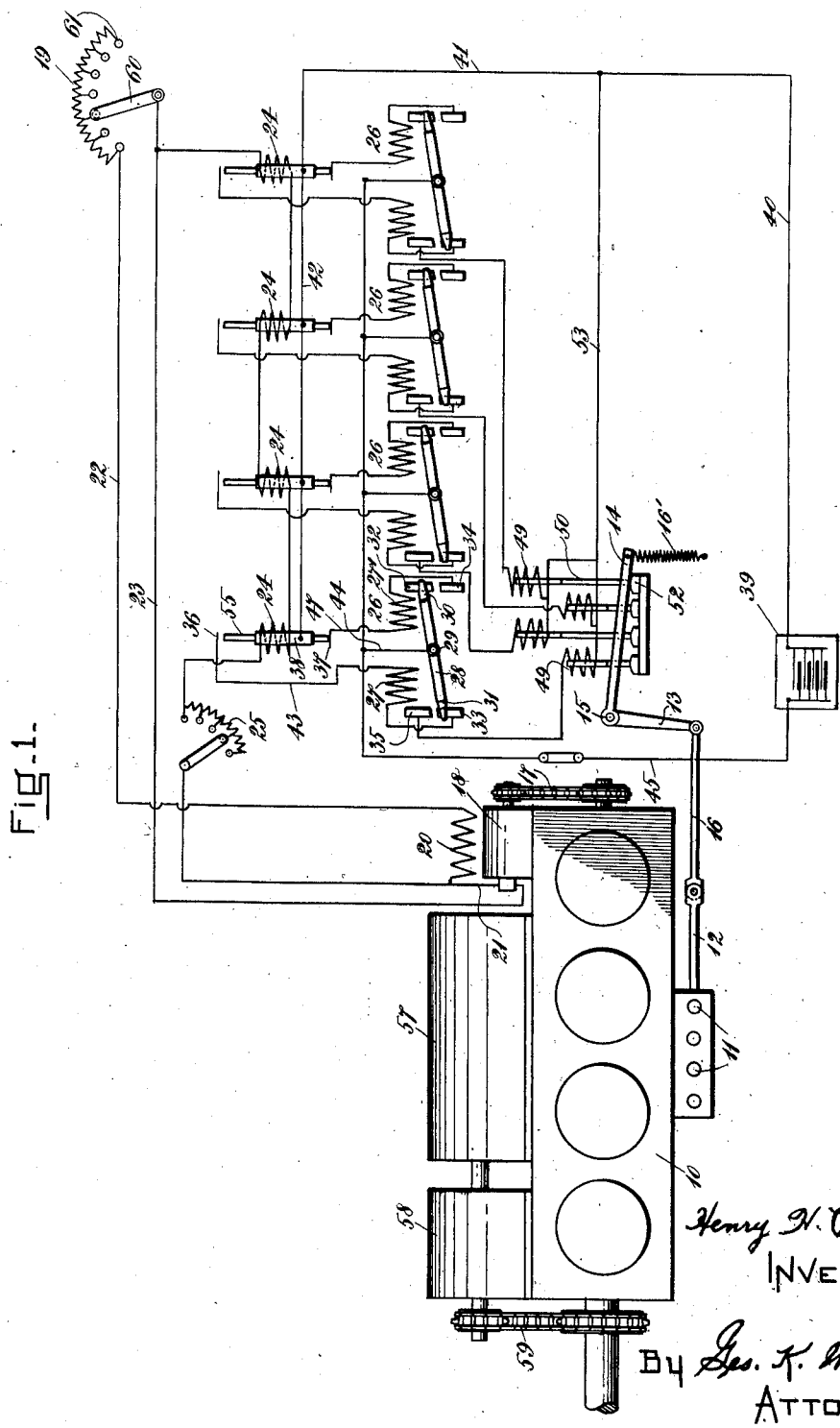

In the particular drawings selected to more fully disclose the principle of my invention, I have shown my improved speed control system applied to a four-cylinder Diesel engine 10 having fuel pumps 11 and throttle-actuating mechanism comprising the throttle rod 12, bell crank formed of the arms 13, 14 and pivoted at 15, the connector rod 16 pivotally connected to the throttle rod and the arm 13 of the bell crank, and the spring 16' for holding the arm 14 in its lowermost position and thereby pushing the throttle arm to its innermost position at which the throttle has its maximum opening. The position of the throttle arm and the extent of the throttle opening is controlled electrically in the manner hereinafter described.

Mounted on the engine and driven thereby in any suitable manner, as for example, by the chain drive 17, is a generator 18 which preferably is driven at one-half of its rated speed when the engine is running at one-sixth of its maximum speed and at that speed develops approximately 55 volts when all of the resistance is cut out of the field regulator 19. For example, said generator may be a ⅛ kilowatt, 10 volt generator developing 110 volts at 1000 revolutions per minute, geared to have ten times the speed of the engine so that if the maximum engine speed was 300 revolutions per minute, the maximum generator speed would be 3000 revolutions per minute, and when said engine was running at one-sixth of its normal maximum speed, or 50 revolutions per minute, the generator would have a speed of 500 revolutions per minute, or one-half of its own normal speed, at which it would generate 55 volts, as aforesaid, with all the resistance cut out of the field regulator. If, however, the maximum speed of the engine was 600 revolutions per minute, the generator would be geared to have five times the speed of the engine, or a maximum speed of 3000 revolutions per minute, and at one-sixth of the maximum engine speed, or 100 revolutions per minute, the generator would have a speed of 500 revolutions per minute, or one-half of its normal speed, so that it would generate about 55 volts with all the resistance cut out of the filed regulator 19. It is to be understood, however, that I do not limit myself to any particular ratio of engine to generator speed. The field regulator should be provided with sufficient resistance to reduce the generator voltage to 55 volts when the engine and generator are both running at maximum speed, and to hold said voltage at approximately that value. By this arrangement my system is operative to control the engine speed from maximum to one-sixth of maximum, a range which is sufficiently wide for all practical purposes, although it is to be understood that I do not limit myself in this particular.

In the present instance, the generator has a shunt field 20 connected across the brushes thereof by the lead 21 and the conductor 22, the field regulator 19 and the conductor 23.

Electrically associated with the external circuit of said generator and shown in the present instance as serially connected therewith are a plurality of governor magnets 24 which in the present instance are shown as four in number, although only one such magnet or any desired number of the same may be employed. A rheostat 25 preferably is included in the circuit of said governor magnets for permanently adjusting the current supplied thereto. Each governor magnet controls a double relay 26 consisting of two electromagnets 27 27' spaced apart on the same axial line and having a common armature 28 pivoted intermediate the ends thereof on the stud 29. Each said armature carries at its ends switch members 30, 31 which are electrically, as well as mechanically, connected thereto and said switches are arranged to co-operate with the stationary contact blocks 32, 33, respectively, when said armature is in one of its two possible fixed positions, and the fixed contact members 34, 35 when said armature is in the other of its two possible fixed positions.

Each of the governor magnets 24 is arranged to close the circuit of the lefthand magnet 27 of its double relay when the voltage of the generator rises and simultaneously to open the circuit of the righthand magnet 27' of said double relay; and to close the circuit of said righthand magnet 27' and simultaneously open that of the lefthand magnet 27 of said double relay when the voltage of said generator falls. This is accomplished in the present instance by providing the conductive heads of the casing of each magnet 24 with contacts 36, 37, respectively, with which the core 38 of each said magnet, shown in the present instance as a solenoid is arranged to co-operate. It will be apparent that the contacts made by said core 38 with the contact points 36, 37, respectively, are merely touch contacts and are not positive, being subject to the vibration of the vessel so that the trembling or vibrating non-positive contact so made would cause "hunting" if the throttle-actuating mechanism were controlled directly by the magnets 24.

It is for this reason that I interpose between the governor magnets and the throttle-actuating mechanism the double relay 26, the armature of which is capable of only two fixed positions and which, having assumed one of said positions, simultaneously de-energizes the magnet which caused it to assume such position, and remains in said position until the other magnet of said double relay is energized, whereupon having assumed the second of said two fixed positions, said other magnet simultaneously is de-energized. Thus, it will be seen that said double relay is self-locking and eliminates the effect of vessel vibration on the contacts of the governor solenoid 24, thereby preventing "hunting". It will be apparent that a variety of double self-locking relays interposed between the governor magnet and the throttle-actuating mechanism may be employed for this purpose, and therefore I do not limit myself to the particular form of relay shown. In the present instance the relays 26 function as follows: When the voltage of the generator 20 rises sufficiently to cause the core 38 to make contact with the point 36, there is a circuit from the storage battery or other source of electrical energy 39 through the leads 40, 41 and 42, the core 38, contact point 36, lead 43 electromagnet 27, contact block 33 armature 28 and leads 44, 45 back to the battery, whereupon said electromagnet 27 is energized and moves said armature toward its polepieces 46, 46 (Fig. 2), thereby removing the switch 31 from the contact block 33, thus de-energizing said magnet 27, and placing the switches 31, 30 on the contact blocks 35, 34, respectively. In this position said armature remains until the voltage of the generator falls sufficiently to enable the core 38 to make contact with the point 37, whereupon there is a circuit from the battery 39 through the leads 40, 41, and 42, said core 38, contact 37, lead 47, electromagnet 27', contact block 34, armature 28 and leads 44 and 45 back to the battery. The resulting energization of the electromagnet 27' draws the armature 28 toward the pole-pieces 48, 48 (Fig. 2) and thereby removes the switch 30 from the contact block 34, thus opening the circuit of said electromagnet 27', and places the switches 30, 31 on the contact blocks 32, 33, respectively, in which positions they are shown in Figs. 1 and 2. In the present instance one pole of the storage battery 39 is electrically connected to the core 38 of the governor magnet by way of the metallic casing 24' to which the lead 41 is mechanically and electrically connected by the screw 24'' and the metallic tube 24''' which serves to guide said core 38 and with which the latter is in electrical contact.

The throttle-actuating mechanism is controlled by the throttle-controlling magnets 49, herein shown as four in number, and as of the solenoid type. Threaded to the core 50 of each of the solenoids 49 is a bolt 51 which passes through an aperture in the arm 14 of the bell crank, and is provided with a nut 52 at the lower end thereof which, by coming into contact with the under side of the arm 14 when the solenoid 49 is energized, causes the bell crank to be moved in a counter-clockwise direction around its pivot 15 against the tension of the spring 16. It will be noted by reference to Fig. 1 that when the throttle is fully open the arm 14 is inclined downwardly and is held against the nut 52 on the core 50 of the righthand solenoid 49 and that the nuts on the cores of the other solenoids 49 are out of contact with said arm 14 by distances progressively increasing toward the left so that as said solenoids are successively energized beginning with the right-hand solenoid, said nuts act successively, beginning with the righthand nut, on said arm 14.

The circuits of the throttle-controlling magnets 49 are opened and closed by the double self-locking relay 26 as follows: With the parts in the positions shown in Fig. 1, each of the electromagnets 49 is de-energized. When the armature 28 of the lefthand double relay 26 assumes the reverse position from that shown in the drawings in the manner above set forth, and the switches 31, 30 are placed respectively, on the contact blocks 35, 34, there will be a circuit from the battery 39, leads 40 and 53 through the lefthand magnet 49 to the contact block 35 and thence back to the battery by way of the switch 31, armature 28 and leads 44, 45; and obviously the same is true of the other three solenoids 49 which are controlled, respectively, by the other three double relays 26.

While I do not limit myself to any particular number of governor solenoids, I prefer to employ at least six and to adjust the compression springs 54 disposed within the tube 24''' and surrounding the pin 55 carried by the upper end of the core 38 by means of the washers 56 or otherwise, so that the plungers or cores 38 of the solenoids will be raised sufficiently to close the several circuits at the contact points 36 when the voltage of the generator reaches, by way of example, 55, 56, 57, 58, 59 and 60 volts, respectively, the righthand solenoid 24 being, in the present instance the first to operate.

The operation is as follows: By means of compressed air stored in the tank 57 by the air compresser 58 driven by the engine through the chain drive 59, or by other suitable means, the engine is started with the arm 60 of the field regulator on any desired contact point 61 of said regulator. The engine being under way and it being desired to operate both engines of a twin-screw vessel at the same speed, it is necessary only to turn the levers 60 of the field regulators until the speedometer in the wheelhouse registers the same for both engines which are then held automatically at that speed. If either engine speeds up, the voltage of the generator rises and in the manner above set forth causes the plungers 50 of the throttle-controlling solenoids to rise one after the other until they pull the throttle rod 12 sufficiently to reduce the speed of the faster running engine to equality with that of the other engine; and vice versa, if one engine slows down, the voltage delivered by the generator is reduced and some of the throttle-controlling magnets 49 are de-energized thereby, allowing the spring 16 to pull down the bell-crank 14 and drive the throttle rod 12 to the left, thus increasing the amount of fuel feed to the engine in question by the fuel pumps 11, and raising its speed to equality with the other.

When it is desired to steer without the use of the rudder and without signalling the engine room, the arm 60 of one of the field regulators is moved to give the appropriate engine a speed different from that of the other with the result that the course of the vessel is changed.

Having thus described one embodiment of my invention without however limiting the same thereto, what I claim and desire to secure by Letters Patent is:—

1. In a speed-control system, the combination with a prime mover having a throttle, throttle-actuating mechanism and an electrical generator driven by said prime mover, of means for controlling said throttle-actuating mechanism in accordance with the voltage developed by said generator, said means comprising a field regulator for controlling the voltage of said generator, a governor-magnet electrically associated with said generator, a relay controlled by said governor-magnet, said relay being constructed and arranged to open its own circuit after the energization thereof, and a throttle-controlling magnet controlled by said relay.

2. In a speed-control system, the combination with a prime mover having a throttle, throttle-actuating mechanism and an electrical generator driven by said prime mover, of means for controlling said throttle-actuating mechanism in accordance with the voltage developed by said generator, said means comprising a field regulator for said generator, a governor-magnet electrically associated with said generator, a double relay controlled by said governor-magnet, said double relay having an armature pivoted intermediate the ends thereof and constructed and arranged to open the circuit of said relay after the energization of the latter and to remain in one of two fixed positions, and a throttle-controlling magnet, the circuit of said throttle controlling magnet being closed by said armature of said double relay when said armature is in one of said fixed positions and being opened by said armature when the same is in the other of said fixed positions.

3. A speed-control system comprising in combination a prime mover, having a throttle, throttle-controlling mechanism, an electrical generator driven by said prime mover, a field regulator for the said generator, a governor-magnet electrically associated with said generator and responsive to changes in the voltage thereof, a double relay comprising two electromagnets, a common armature for said electromagnets, said armature being pivoted intermediate the ends thereof, connections whereby the circuit of one of said electromagnets is closed by said governor-magnet when the voltage of said generator rises, other connections whereby the circuit of the other of said electromagnets is closed when the voltage of said generator falls, a throttle-controlling magnet, and connections whereby the circuit of said throttle-controlling magnet is closed and opened by the energization of said electromagnets, respectively.

In testimony whereof, I have hereunto subscribed my name this 6th day of Nov. 1930.

HENRY H. CUTLER.